F. YUNG.
COMBINED CANE, GUN, FISHING ROD, AND UMBRELLA.
APPLICATION FILED MAR. 23, 1917.
1,283,015.
Patented Oct. 29, 1918.
3 SHEETS—SHEET 1.
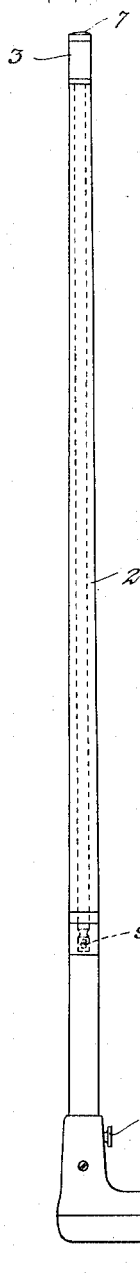
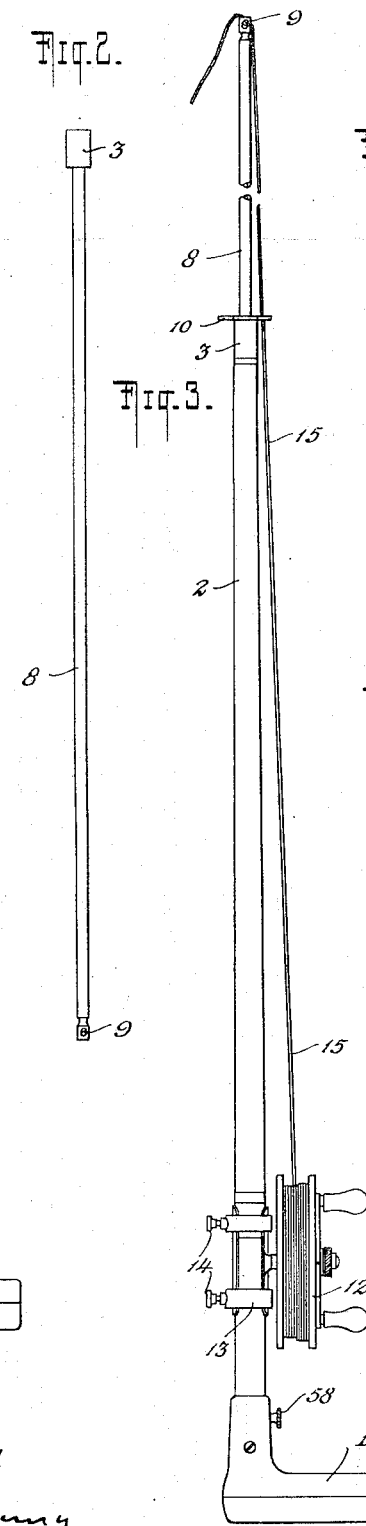
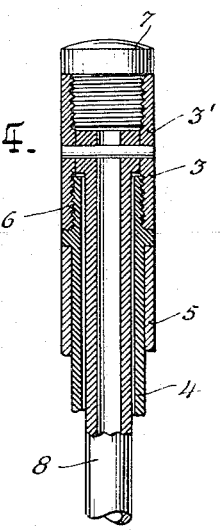
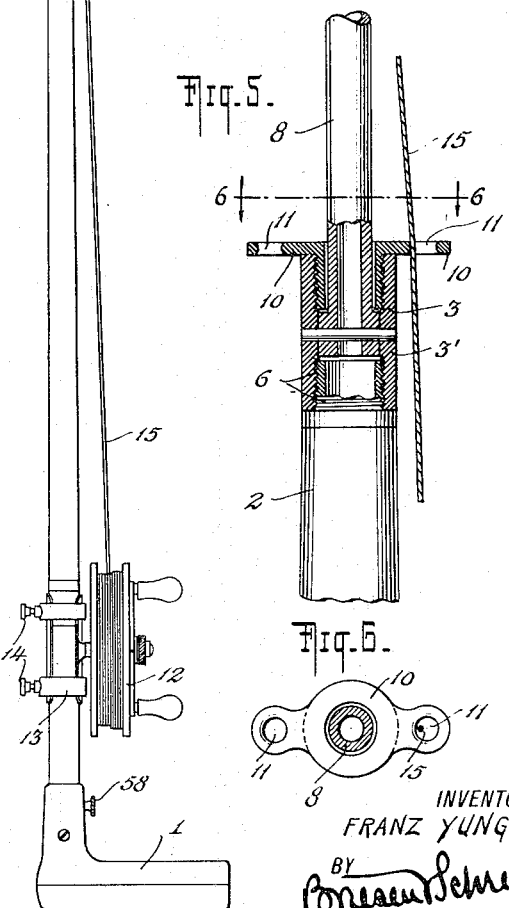
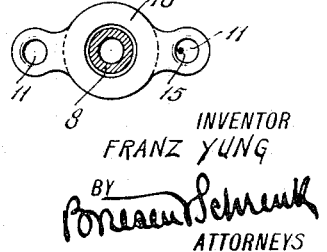
WITNESSES
George Du Bon
INVENTOR
FRANZ YUNG
BY
ATTORNEYS F. YUNG.
COMBINED CANE, GUN, FISHING ROD, AND UMBRELLA.
APPLICATION FILED MAR. 23, 1917.
1,283,015.
Patented Oct. 29, 1918.
3 SHEETS—SHEET 2.
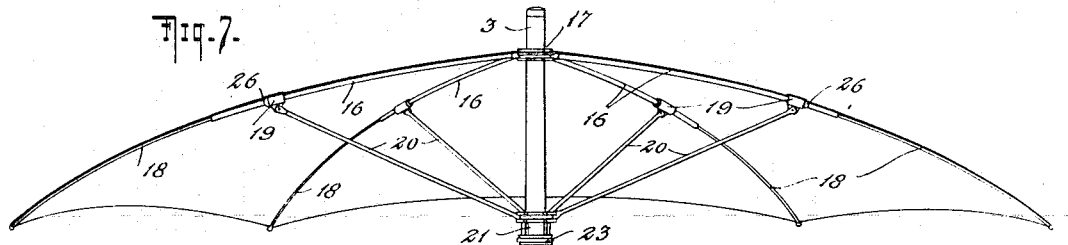
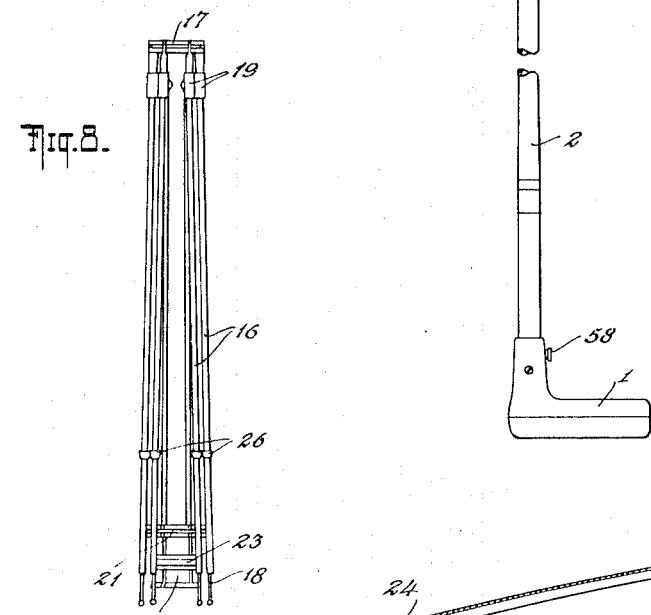
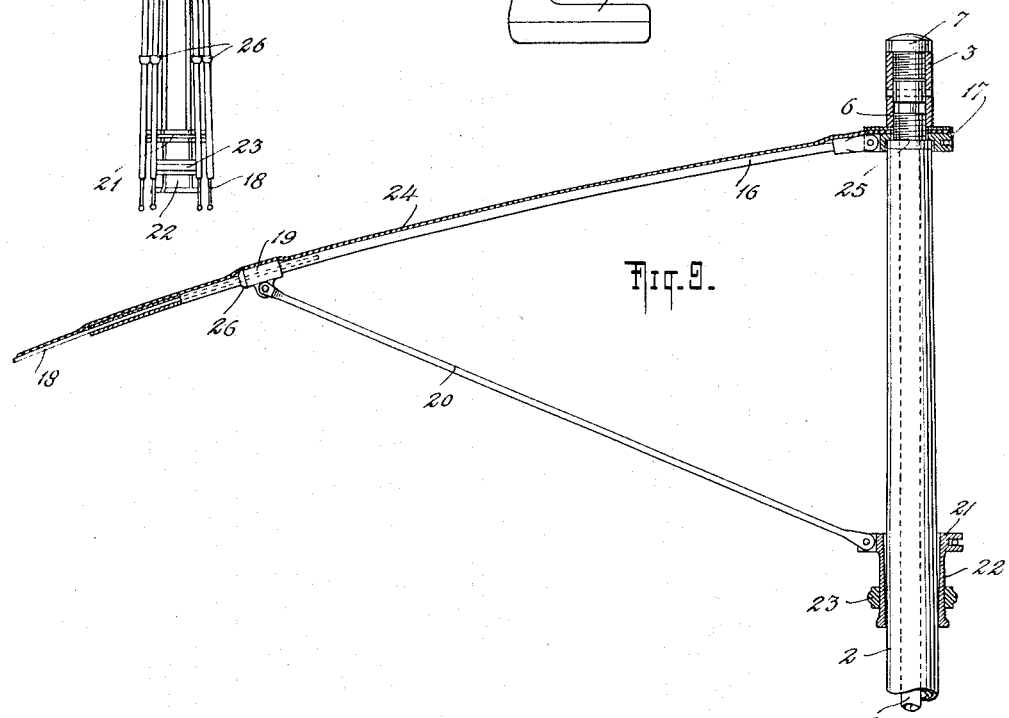
WITNESSES
INVENTOR
FRANZ YUNG
BY
ATTORNEYS

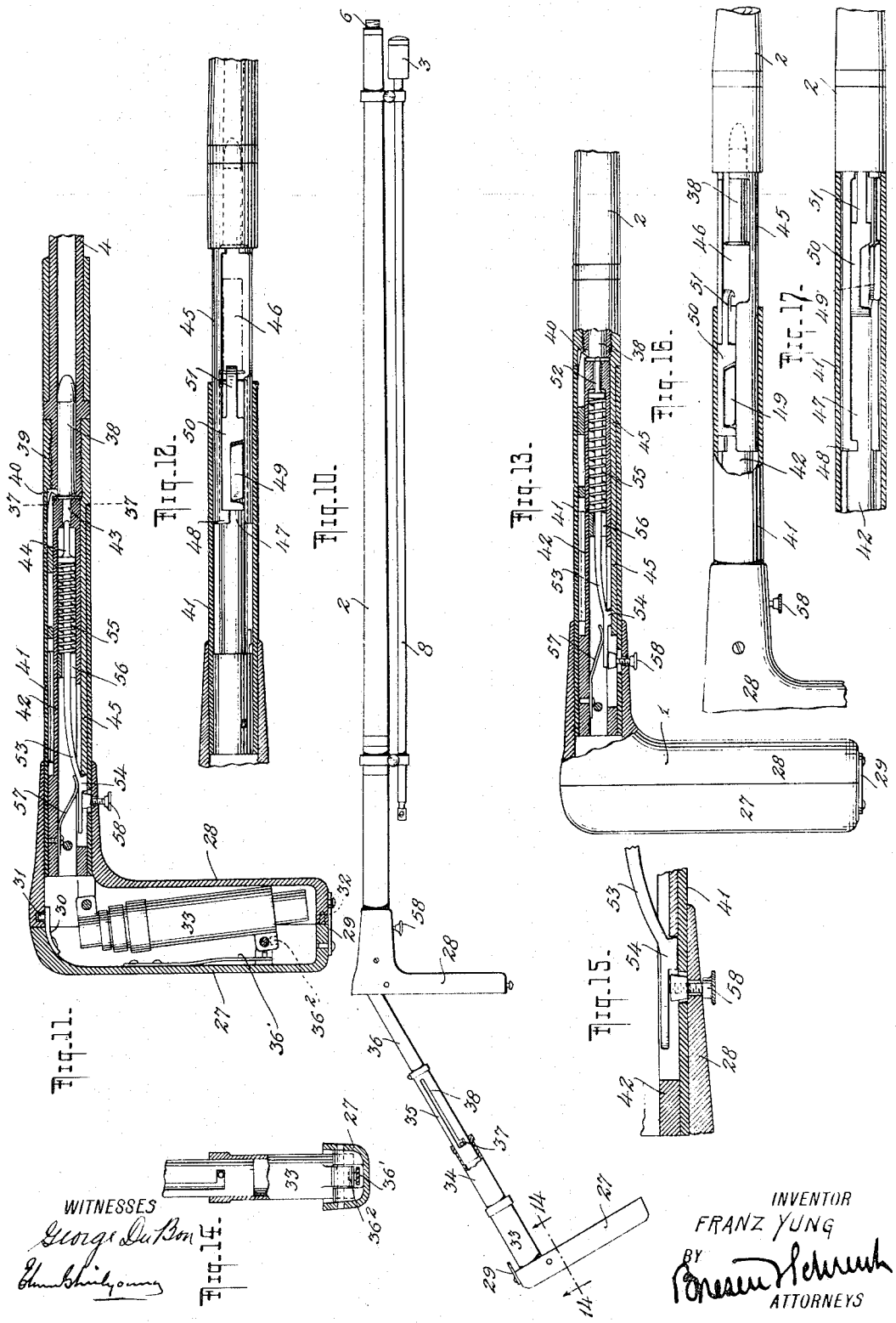

UNITED STATES PATENT OFFICE.

FRANZ YUNG, OF NEW YORK, N. Y.

COMBINED CANE, GUN, FISHING-ROD, AND UMBRELLA.

1,283,015.      Specification of Letters Patent.      Patented Oct. 29, 1918.

Application filed March 23, 1917. Serial No. 156,969.

*To all whom it may concern:*

Be it known that I, FRANZ YUNG, a citizen of the United States, residing in the borough of Manahattan, city, county, and State of New York, have invented certain new and useful Improvements in Combined Canes, Guns, Fishing-Rods, and Umbrellas, of which the following is a specification.

My invention relates to a combined cane, gun, fishing rod and umbrella and has for its object to provide an arrangement of the character referred to which shall be light, compact, convenient and comparatively simple and inexpensive to manufacture.

More particularly my invention has for its object to provide an arrangement, of the character specified, so constructed that any one of the individual devices thereof, as, for example, the cane or gun, may be quickly and easily constituted out of the parts which go to make up the completed device. Still a further object of my invention is to so construct the combined arrangement that as many parts thereof as possible shall be common to each individual device thereof, as for example the gun or cane.

My invention will be found especially useful by tourists, pedestrians and those who, desiring to take trips of greater or less duration, wish to carry as little luggage as possible while at the same time being provided with the various conveniences enumerated. Ordinarily my improved arrangement resembles an ordinary can or umbrella and may be carried as such. If at any time the owner desires to fish or shoot, the cane or umbrella, as the case may be, may be converted instantly into a fishing rod or a gun as may be desired.

My invention will be better understood by referring to the accompanying drawings, in which Figure 1 represents a plan view of my invention as it appears when used as a cane; Fig. 2 represents an extension, ordinarily carried within the shaft of the cane, but adapted to be removed therefrom and attached to the cane so as to constitute a fishing rod; Fig. 3 shows my invention when used as a fishing rod; Fig. 4 is a longitudinal section, enlarged, through the tip of my invention when used as a cane; Fig. 5 is a section, similar to Fig. 4 of the joint at the base of the extension of Fig. 2 and showing how the extension is fastened; Fig. 6 is a plan view taken along the line 6—6 of Fig. 5 showing the line carrier of the fishing rod; Fig. 7 is an elevation showing my invention when arranged as an umbrella; Fig. 8 is a plan view, enlarged, showing the umbrella frame (without cover) as it appears before attaching it to the cane shaft which serves as a handle therefor; Fig. 9 is a greatly enlarged view, part section and part elevation, showing how my umbrella frame is attached to the cane shaft or handle and showing also details of its construction; Fig. 10 is a view of my invention as it appears when used as a gun; Fig. 11 is a longitudinal section through the butt end of my invention showing the interior details belonging to the gun mechanism, the part constituting the gun stock being shown folded up and as it is when the device is used as a cane; Fig. 12 is a view of Fig. 11, taken from above, but partly in section, showing the breech mechanism when it is open; Fig. 13 is a view, similar to Fig. 11, showing the position of the firing pin just after the gun has been fired; Fig. 14 is a view, twice enlarged, taken along the line 14—14 of Fig. 10; Fig. 15 is a sectional view showing the trigger mechanism in safety position; Fig. 16 is a view, somewhat similar to Fig. 12, but taken from the side instead of from above; and Fig. 17 is a view, similar to Fig. 16, but showing the breech mechanism closed.

Referring to the drawings, an understanding of my invention will be assisted by considering the same as based upon a cane or walking stick as shown in Fig. 1, said cane comprising a handle 1, shank or shaft 2 and ferrule 3. The shaft is tubular for the greater part of its length said tube comprising an inner metallic tube 4 and an outer sheathing or covering tube 5, preferably of wood or papier-mâché.

The ferrule 3 comprises a short tubular section 3' internally threaded at each end; the inner end is thus adapted to be screwed fast to the shank of the cane by means of the external threads 6 which are turned upon the outer end of tube 4 while the other end takes the screw plug 7 which constitutes the tip of the cane.

A slender extension 8, preferably a tube for lightness, has one end enlarged and pinned fast centrally inside of sleeve 3' so that, when the ferrule is in position, as shown in Figs. 1 and 4, the part 8 extends within the shank to within a short distance of handle 1. The free end of tube 8 is terminated by a perforated tip 9.

By unscrewing plug 7 and also unscrewing sleeve 3' from tube 4, extension 8 may be withdrawn from the shank 2 and the sleeve then reversed and screwed fast again upon the end of tube 4, thus attaching the extension to the end of the shank 2 as shown in Fig. 3.

A cross bar or line carrier 10, having a perforation 11 at each end and centrally perforated to slip over extension 8, is provided with a threaded sleeve by which it is attached to the free end of tubular section 3'.

A reel 12 is attached to the shank 2 near the handle 1 being held in place by clamp rings 13 and clamp screws 14. The line 15 is passed through one of the perforations 11. The fishing rod is thereby constituted as shown in Fig. 3.

Fig. 8 shows the umbrella frame, comprising a plurality of ribs 16 hinged to a central annular cap 17; each rib 16 is tubular and carries a telescopically fitted outer rib 18 which may be nearly as long as the rib 16 and may be pulled out until arrested by a suitable stop (not shown). Each rib 16 carries a sliding sleeve 19 hinged to the outer end of a brace 20 the inner ends of all the braces being hinged to a riser ring 21; the lower part of this riser ring comprises a split tube 22 upon which slides a clamp ring 23, the bottom of the split tube being flanged outwardly to prevent ring 23 from slipping off.

The umbrella frame is covered with fabric 24 in the usual way. When folded, as in Fig. 8, the outer margin of the fabric, corresponding to the extensible rib 18, readily folds back when the ribs are closed into the outer tubular ribs 16.

To use my invention as an umbrella, the frame, as just described, is mounted upon the cane of Fig. 1. This is done by removing the ferrule 3 and then threading the riser ring 21 and annular cap 17 down over the shank 2 from its smaller end. The opening in cap 17 should be just large enough to go over the external threads 6. The ferrule may then be replaced and will clamp the cap tightly against the shoulder 25 at the base of these threads.

The upper ring of riser ring 21 has a sufficiently great inside diameter to slip over the tapered shank 2 far enough to enable the umbrella to be folded in the usual way. The individual segments of split tube 22, however, are tapered oppositely to the shank 2, and ring 23 is of such size that when drawn away from the upper ring these segments are tightened against the shank and hold the umbrella open.

The sleeves 19 are limited in their outward sliding movement, when opening the umbrella, by stops 26.

The use of my invention as a gun may also be best considered as based on the cane as shown in Fig. 1. The detailed construction of the head 1 and shank 2 of this cane is shown in Figs. 11 and 17 inclusive.

Referring to these last named figures the handle 1 is hollow and split, comprising an outer member 27 and an inner member 28. These two members are ordinarily locked together by a suitable catch 29 at the outer end of the handle and by a spring 30 at the other end, this spring being fixed to member 27 and carrying a pin 31 which engages member 28. Dowel pins 32 prevent any sidewise shifting of the two members with reference to one another.

The two members 27, 28, are each respectively attached, the former at its outer end and the latter at its inner end, to opposite ends of a series of tubes 33, 34, 35, 36. These tubes are telescopically held together by pins 37 and slots 38 and ordinarily lie nested together within the handle as shown in Fig. 11. Each slot 38 opens into a circumferential slot covering substantially 30° of arc.

By opening catch 29, lifting away slightly the outer end of member 27, and then sliding said member forwardly so as to free pin 31, member 27 may be pulled away from member 28 so as to draw out the tubes 33, 34, 35, 36; by then suitably rotating member 27 about the axis of these extended tubes said member may be swung through 180° as shown in Fig. 10 and, at the same time, the tubes will be mutually locked so that they can not be closed together. The performance of this operation will place tube 33 at right angles to member 27 in which position it will be maintained by a spring 36' having a pin adapted to engage a recess 36² formed in a lug attached to the tube.

The tube 4 constitutes the barrel of the gun and ends at the point indicated by the dotted line 37. This end portion is bored out or chambered to receive the cartridge 38 and is surrounded by a short sleeve 39, the end of the tube and the corresponding portion of the inside end of the sleeve being cut away at 40 so as to accommodate the end of the ejector spring as will later be described.

To the inner handle member 28 is fixed a tube 41 the free end of which abuts against sleeve 39 when the breech is closed, as in Figs. 11, 13 and 17. Inside of this tube 41 is another tube 42, also fixed to the handle member 28, the free end of which is solid, except for a perforation 43 for the firing pin 44, and serves as a breech block.

Between tube 41 and tube 42 is an intermediate sleeve 45, fixed at one end to sleeve 39. This sleeve 45 has a longitudinal slot, wide enough at one end 46 to permit the cartridge or cartridge shell to pass therethrough, and narrower throughout its remaining portion 47. At the extreme end of this narrowed portion the slot is partially closed by a short lug 48 projected into the slot from one wall thereof.

Fixed to tube 42 is an elongated radially projecting breech locking lug 49 narrower than slot portion 47. When the breech is open, as in Figs. 12 and 16, this lug projects into slot portion 47 and retains in position the ejector spring 50. This ejector spring is cut away on one side so as to embrace the ends of lug 49 and dimensioned so that, with said lug, its one end will bridge the space between the walls of slot portion 47. The other end of the ejector spring is formed as a flexible spring 51 the end of which is turned inwardly so as to slip over and engage the end of the cartridge shell when the breech is closed. In this closed position, also, if the handle member 28 be twisted slightly with reference to the barrel of the gun the locking lug 49 will slip into the wider slot portion 46, as best seen in Fig. 17, and be there retained by the tube wall portion between it and the handle. The breech is thereby locked and the gun ready for firing.

The firing pin 52 is carried at the end of a resilient arm 53; the other end of arm 53 is sprung downwardly and provided with a pin locking lug 54 while a spring 55 between a shoulder at the base of the pin and a retaining collar 56, inside of breech block 42, tends to keep the firing pin pressed forwardly and constitutes the driving force by which the firing pin is actuated when the gun is fired. A spring 57, which presses downwardly upon arm 53, tends to keep the locking lug 54 always in its lowermost position.

To use the gun, the handle members being already separated as shown in Fig. 10, the barrel and handle member 28 are grasped in the two hands and a twist applied thereto so as to release the locking lug 49 and bring it into line with the narrowed slot portion 47. Barrel and handle member 28 are then pulled apart linearly. This will put the parts into the position shown in Fig. 12. Since the handle member 28 is attached to tube 42 and hence controls the movement of locking lug 49, this lug, as it passes into the narrowed slot portion 47, will carry with it the ejector spring 50 and hence the shell from the previous discharge. The shell may then readily be dropped out of the breech through the outer slot portion 46 and a fresh shell inserted and pressed into the breech. Fig. 16 shows a cartridge 38 as it is thus being inserted into the breech.

When the breech is open, it will be seen (Fig. 12, for example) that the sleeve 45 is well forward of the pin locking lug 54. When the breech is again closed the end of this sleeve will engage lug 54 and push the arm 53 toward the handle of member 28 thereby compressing spring 55 and putting the firing pin 52 into position for firing as shown in Fig. 11. In this position the free end of arm 53 lies upon the washer fixed at the inner end of a trigger button 58 held in the handle member 28.

In firing the gun, handle member 28 is used as a grip and handle member 27, with the intermediate connecting tubes 33, 34, 35 and 36 as a stock. When ready to fire, the trigger button 58 is pressed upwardly, thus throwing locking lug 54 above the end of tube 45 and enabling the spring 55 to propel the firing pin and discharge the cartridge.

By turning the trigger button 58 up on its threaded spindle the internally attached washer may be clamped fast against the tubularly extended portion of member 28 thus placing the mechanism at "safety" and making it impossible to fire the gun.

When the arrangement is constituted and used as a gun, as just described, the extension 8 may be held out of the way below the barrel thereof, as shown in Fig. 10, by using suitable clamping devices.

To reconstitute the gun as a cane, handle members 27 and 28 are brought together and locked, thus closing the tubes 33, 34, 35, 36 together, by reversing the above described operations. Extension 8 and attached ferrule 3 may then be dismounted from below the barrel (Fig. 10) and be replaced in the position shown in Fig. 1.

Having described my invention, I claim:—

A new article of manufacture comprising a hollow shank and a handle together constituting a cane; a rod having one end which serves as the cane ferrule and is reversibly attached to the free end of the shank so that the rod lies within the shank when the article is used as a cane but at other times forms an extension of the shank so as to constitute a fishing pole; the shank also being adapted for use as a gun barrel if the rod is entirely removed, the end of the shank nearest the handle being provided with breech and firing mechanism for such purpose; the handle being hollow and divided into two members which are connected together by a plurality of telescopically arranged tubes so as to be relatively extensible whereby the inner member may form a grip and the outer member a stock, these telescopic members when closed together being inclosed in the hollow handle.

In testimony whereof I have hereunto set my hand.

FRANZ YUNG.